(12) United States Patent
Yu et al.

(10) Patent No.: US 7,986,645 B2
(45) Date of Patent: Jul. 26, 2011

(54) APPARATUS AND METHOD FOR FRAME GENERATION FOR A FULL DUPLEX RELAY

(75) Inventors: Tak-Ki Yu, Yongin-si (KR); Seung-Hee Han, Hwaseong-si (KR); Young-Bin Chang, Anyang-si (KR); Hyun-Jeong Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 3 days.

(21) Appl. No.: 12/552,788

(22) Filed: Sep. 2, 2009

(65) Prior Publication Data

US 2010/0054162 A1    Mar. 4, 2010

(30) Foreign Application Priority Data

Sep. 2, 2008  (KR) .................. 10-2008-0086155

(51) Int. Cl.
*H04B 7/14* (2006.01)
*H04J 3/00* (2006.01)
*H04J 1/00* (2006.01)

(52) U.S. Cl. .................. 370/279; 370/280; 370/281

(58) Field of Classification Search .......... 370/310–350, 370/279–281; 455/436
See application file for complete search history.

(56) References Cited

U.S. PATENT DOCUMENTS

| | | |
|---|---|---|
| 2007/0060050 A1 | 3/2007 | Lee et al. |
| 2007/0081483 A1 | 4/2007 | Jang et al. |
| 2007/0087691 A1 | 4/2007 | Lee et al. |
| 2009/0168745 A1 * | 7/2009 | Ahmadi et al. ............... 370/350 |
| 2010/0008328 A1 * | 1/2010 | Maheshwari et al. ........ 370/331 |

* cited by examiner

*Primary Examiner* — Seema S. Rao
*Assistant Examiner* — Wanda Z Russell
(74) *Attorney, Agent, or Firm* — The Farrell Law Firm, P.C.

(57) ABSTRACT

An apparatus and method for generating a frame in a communicating system supporting a full duplex relay. A controller configures a legacy zone and a new zone in a downlink section of the frame according to a TDM scheme, configures the new zone of the downlink section to include an access zone and a relay zone according to a TDM scheme, configures a legacy zone and a new zone in an uplink section of the frame according to the TDM scheme, and configures the new zone of the uplink section to include an access zone and a relay zone according to an FDM scheme.

16 Claims, 15 Drawing Sheets

APPARATUS AND METHOD FOR FRAME GENERATION FOR A FULL DUPLEX RELAY

PRIORITY

This application claims priority under 35 U.S.C. §119 to an application filed in the Korean Intellectual Property Office on Sep. 2, 2008 and assigned Serial No. 10-2008-0086155, the content of which is incorporated herein by reference.

BACKGROUND OF THE INVENTION

1. Field of the Invention

The present invention relates generally to an apparatus and method for frame generation for a full duplex relay in the Institute of Electrical and Electronics Engineers (IEEE) 802.16j system and the IEEE 802.16m system.

2. Description of the Related Art

When a communication network is configured using a conventional design of a cellular mobile communication system, coverage holes may be caused by regional characteristics such as buildings, mountains, tree lines, etc., of the respective regions.

To address these coverage holes, a cellular mobile communication system installs a repeater to provide continuous service in these troubled areas within the cells. However, a repeater may cause performance degradation due to increased noise amplification.

A relay system, which decodes and forwards a signal from a Base Station (BS), instead of simply amplifying the signal, has been proposed as an improvement over the conventional repeater. This type of improved relay system is being extensively researched to provide the coverage extension and throughput enhancement of a cellular mobile communication system. Specifically, the IEEE 802.16j is standardizing a relay system for practical use, wherein in comparison with a conventional single-hop system, the use of the improved relay system improves performance while reducing deployment and maintenance costs.

Relay schemes may generally be classified into two types: (i) a relay scheme performing only one of transmission or reception using one antenna set, and (ii) a relay scheme simultaneously performing transmission and reception using two antenna sets. The former scheme is a half-duplex relay, and the latter scheme is a full duplex relay.

A half-duplex relay may not simultaneously perform transmission and reception in the same frequency band, and performs only one of transmission or reception at a time-by-time division.

Two-time signal transmission for communication between a BS and a Relay Station (RS) and communication between an RS and a Mobile Station (MS) uses twice as much resource consumption than a single-hop system, thus reducing the spectral efficiency and requiring an additional transmit/receive (TX/RX) switching time for relay.

Also, broadcast information for relay is separately transmitted by a BS, and a relay link and an access link are used by time division, which reduces the uplink (UL) coverage of single-hop users served by the BS.

A full duplex relay, which simultaneously performs transmission and reception using two antennas, has been proposed as a scheme for addressing the above limitations. The full duplex relay uses the two antennas to simultaneously communicate with an upper node and a lower node in the same frequency band.

However, it is inefficient to operate the full duplex relay because the current IEEE 802.16j standard is based on the half-duplex relay in spite of the advantages of the full duplex relay.

Also, the full duplex relay may cause an inter-antenna interference because it simultaneously performs transmission and reception using the two antennas, while reusing all the resources.

SUMMARY OF THE INVENTION

The present invention has been designed to address at least the problems and/or disadvantages described above and to provide at least the advantages described below.

More specifically, because inter-antenna interference in a full duplex relay is the interference between two antennas, the full duplex relay is aware of a TX signal and therefore, may cancel the interference in a signal of an RX antenna. For example, the interference cancellation may include Radio Frequency (RF) interference cancellation and baseband interference cancellation. If the interference cancellation is efficiently performed, the interference limitation of the full duplex relay can be addressed, thereby making it possible to address the inefficiency of resource consumption in the half-duplex relay.

However, research on a full duplex relay system is incomplete, failing to effectively support the full duplex relay. What is therefore required is a frame structure for efficiently using the full duplex relay system.

Accordingly, an aspect of the present invention is to provide an apparatus and method for generating a frame for a full duplex relay.

Another aspect of the present invention is to provide an apparatus and method for efficient frame generation for a full duplex relay in the IEEE 802.16j system and the IEEE 802.16m system.

In accordance with an aspect of the present invention, an apparatus for generating a frame in a communication system supporting a full duplex relay is provided. The apparatus includes a controller for configuring a legacy zone and a new zone in a downlink section according to a Time Division Multiplexing (TDM) scheme, for configuring the new zone of the downlink section by an access zone and a relay zone according to a TDM scheme, for configuring a legacy zone and a new zone in an uplink section according to a TDM scheme, and for configuring the new zone of the uplink section by an access zone and a relay zone according to a Frequency Division Multiplexing (FDM) scheme to generate a frame.

In accordance with another aspect of the present invention, a method for generating a frame in a communication system supporting a full duplex relay is provided. The method includes configuring a legacy zone and a new zone in a downlink section according to a TDM scheme; configuring the new zone of the downlink section by an access zone and a relay zone according to a TDM scheme; configuring a legacy zone and a new zone in an uplink section according to a TDM scheme; and configuring the new zone of the uplink section by an access zone and a relay zone according to an FDM scheme.

In accordance with another aspect of the present invention, an apparatus for generating a frame in a communication system supporting a full duplex relay includes a controller for configuring an uplink section by an access zone and a relay zone according to an FDM scheme, and for configuring a downlink section by an access zone and a relay zone according to a TDM scheme to generate a frame.

In accordance with another aspect of the present invention, a method for generating a frame in a communication system supporting a full duplex relay includes configuring an uplink section by an access zone and a relay zone according to an FDM scheme; and configuring a downlink section by an access zone and a relay zone according to a TDM scheme to generate a frame.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF THE EMBODIMENTS OF THE INVENTION

Embodiments of the present invention will be described herein below with reference to the accompanying drawings. In the following description, detailed descriptions of well-known functions or constructions will be omitted in order to prevent obscuring the invention in unnecessary detail.

In accordance with an embodiment of the present invention, a frame structure is provided below for effectively supporting a full duplex relay system through a Frequency Division Multiplexing (FDM) zone configuration that is unsupportable in a half-duplex relay system. Further, this is applicable to operating a single system of the IEEE 802.16j system and simultaneously operating a legacy system and a new system in the IEEE 802.16m system.

Figure 1:
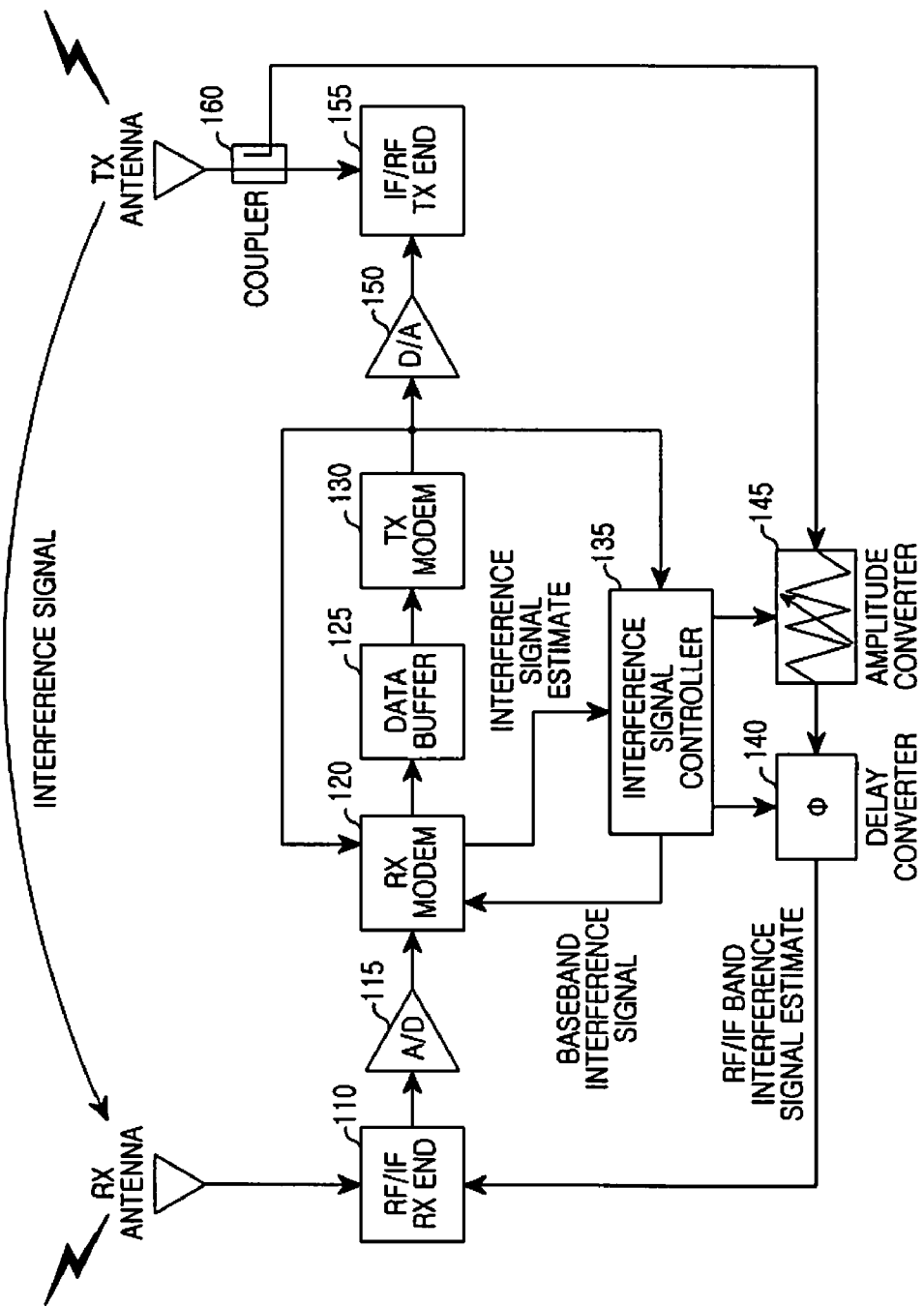
FIG. 1 is a block diagram of a Full Duplex Relay (FDR) according to an embodiment of the present invention.

FIG. 1 is a block diagram of a Full Duplex Relay (FDR) according to an embodiment of the present invention.

Referring to FIG. 1, a full duplex relay system includes two antenna sets to simultaneously communicate with an upper node and a lower node. Further, the full duplex relay system includes wireless TX/RX ends 110 and 115 for transmission/reception, converters 115 and 150 for Analog-to-Digital (A/D) conversion and Digital-to-Analog (D/A) conversion, TX/RX modems 120 and 130 for modulation/demodulation of a signal, a data buffer 125 for temporarily storing processed data, an interference signal controller 135 for cancelling a baseband interference, a delay converter 140, an amplitude converter 145, and a coupler 160. A combination of the wireless TX/RX ends 110 and 155, the converters 115 and 150, and the TX/RX modems 120 and 130 will be collectively referred to herein as "a TX/RX unit".

Figure 2:
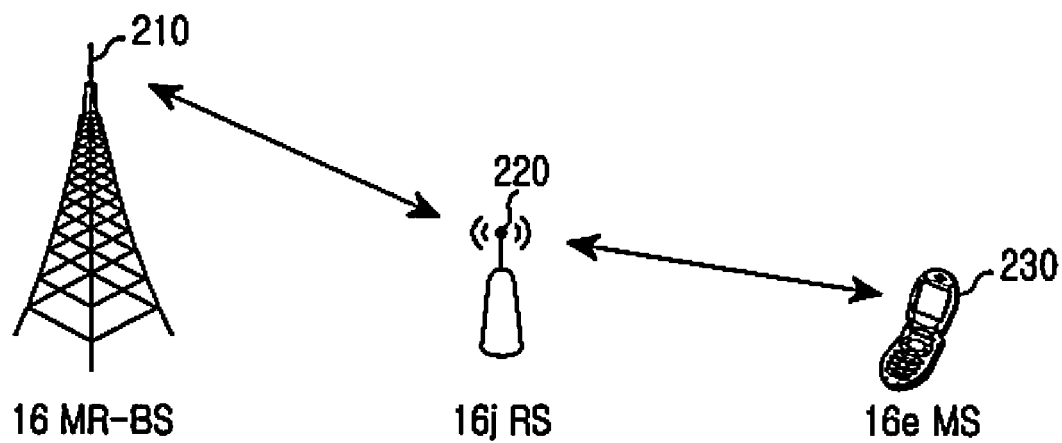
FIG. 2 is a diagram illustrating a configuration of an IEEE 802.16j system according to an embodiment of the present invention.

FIG. 2 is a diagram illustrating a configuration of an IEEE 802.16j system according to an embodiment of the present invention.

Referring to FIG. 2, an access zone and a relay zone may be configured in a DownLink (DL) section and an UpLink (UL) section in the IEEE 802.16j system. The access zone is a communication zone between a 16 Multihop Relay-Base Station (16MR-BS) 210 and a 16e Mobile Station (16eMS) 230 or between the 16MR-BS 210 and a 16j Relay Station (16jRS) 220, and the relay zone is a communication zone between the 16jRS 220 and the 16eMS 230 or between the 16MR-BS 210 and the 16jRS 220.

In the conventional IEEE 802.16j standard, both of the two sections adopt a Time Division Multiplexing (TDM) zone configuration scheme. This, however, is based on a full duplex relay system, which has a disadvantage of the UL coverage loss in an UL section.

Figure 3:
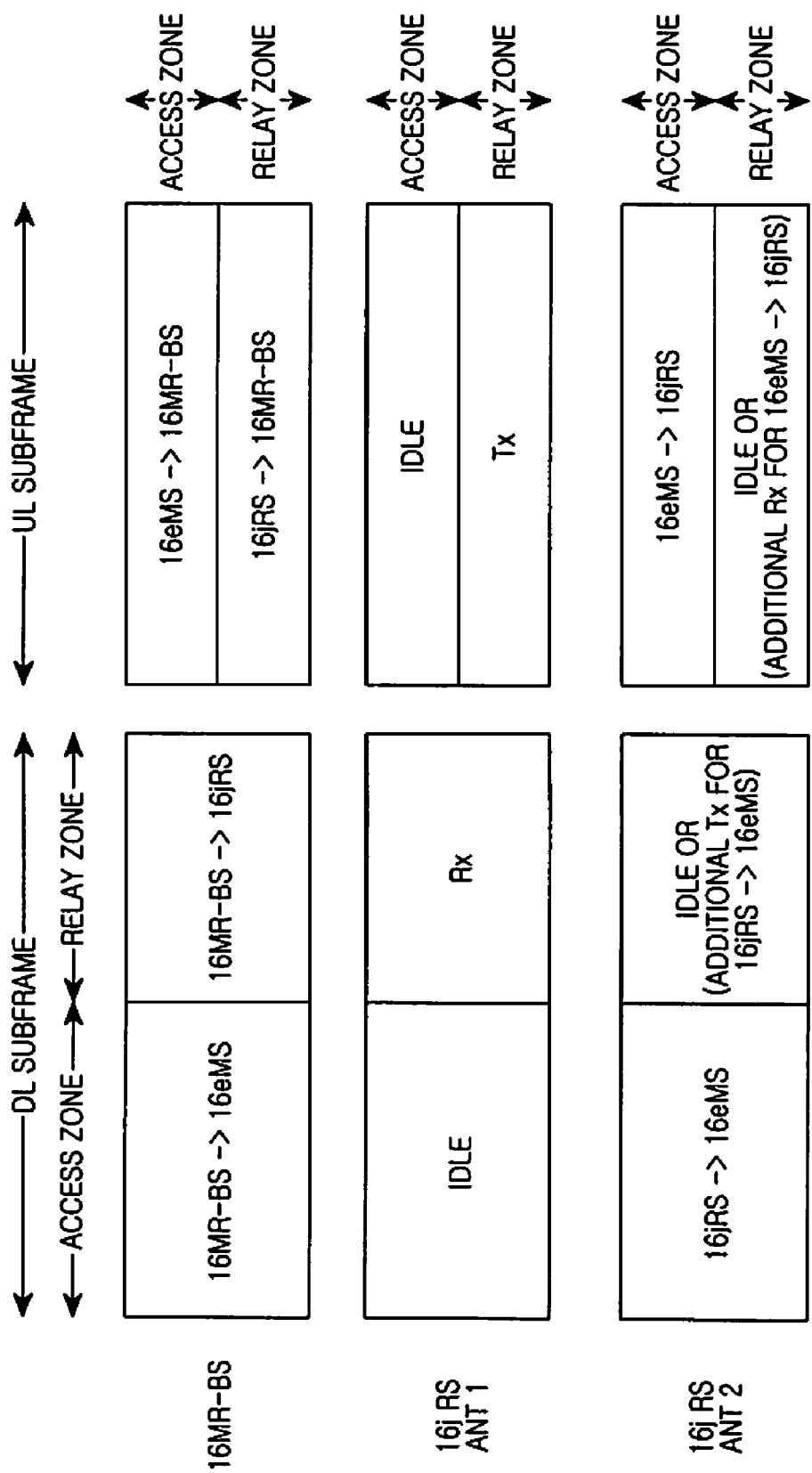
FIG. 3 is a diagram illustrating a frame structure in a full duplex relay IEEE 802.16j system according to an embodiment of the present invention.

In accordance with an embodiment of the present invention, an access zone and a relay zone of a UL section in an FDM scheme are configured for use in a full duplex relay, a frame structure of which is illustrated in FIG. 3.

FIG. 3 is a diagram illustrating a frame structure in a full duplex relay IEEE 802.16j system according to an embodiment of the present invention. More specifically, FIG. 3 illustrates a configuration of an access zone and a relay zone of a UL section in an FDM scheme, when using a full duplex relay, as described above.

Referring to FIG. 3, a UL subframe is divided using the FDM into an access zone and a relay zone.

Figure 4:
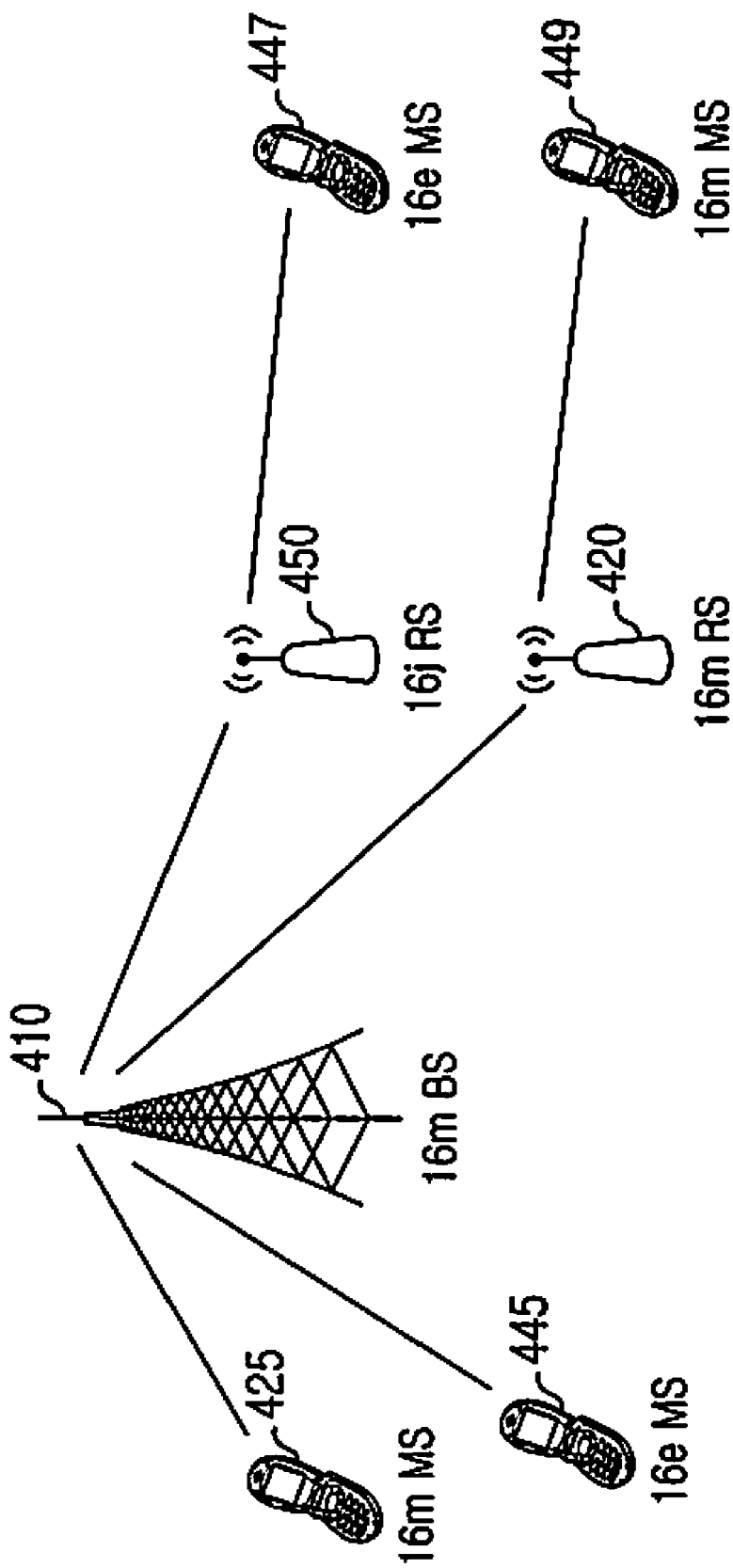
FIG. 4 is a diagram illustrating a configuration of a full duplex relay IEEE 802.16m system according to an embodiment of the present invention.

FIG. 4 is a diagram illustrating a configuration of a full duplex relay IEEE 802.16m system according to an embodiment of the present invention.

Referring to FIG. 4, legacy systems (IEEE 16j and IEEE 16e) and a new system (IEEE 16m) coexist in the IEEE 802.16m system. A 16m BS 410 may accommodate new-version nodes 420, 425, and 449 and also lower-version nodes 445, 450, and 447. Herein, a frame configuration may also be divided into a legacy zone and a new zone.

In accordance with the embodiments of the present invention, a frame structure for an IEEE 802.16m relay in a new zone is divided into a type A structure and type B structure.

Herein, a legacy zone configuration may be a TDM configuration as for the conventional IEEE 802.16j, or an FDM configuration as described above. Hereinafter, a zone denoted as "a sub-zone" in the drawings will also be referred to merely as a zone in the description.

The type A structure configures a new zone to include an access zone and a relay zone, wherein a DL section of the new zone is configured using TDM and a UL section of the new zone is configured using FDM. Herein, a legacy zone and a new zone in the IEEE 802.16m may be configured in such a way that a UL section is set to TDM or FDM.

Figure 5:
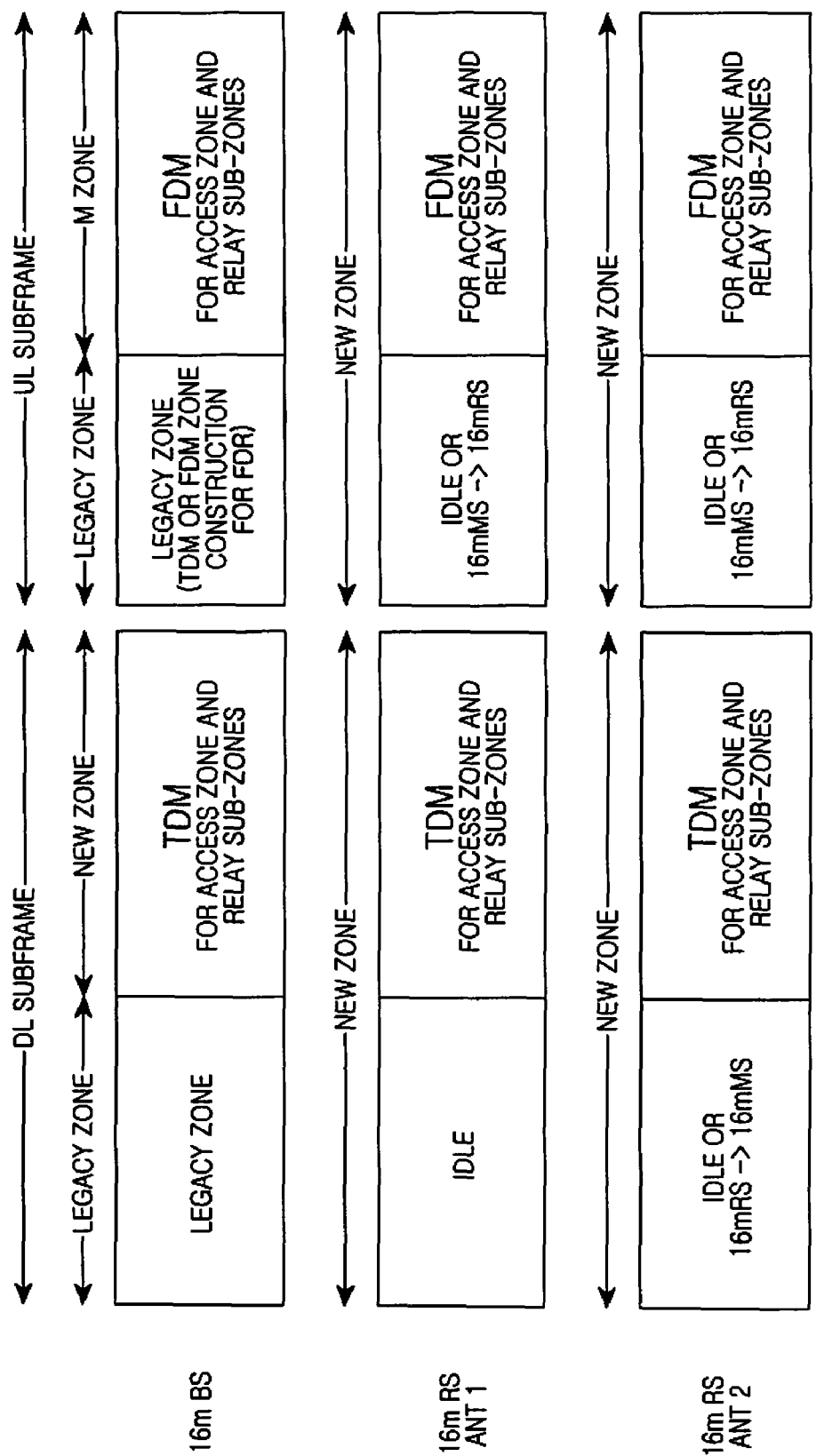
FIG. 5 is a diagram illustrating a type A of a full duplex relay IEEE 802.16m frame structure according to an embodiment of the present invention.

FIG. 5 is a diagram illustrating a type A structure of a full duplex relay IEEE 802.16m frame structure according to an embodiment of the present invention.

Referring to FIG. 5, an M zone denotes a new zone. A DL frame is divided into a legacy zone and a new zone. Herein, the new zone uses a TDM configuration. Also, a UL frame is divided into a legacy zone and a new zone. Herein, the new zone (or the M zone) uses an FDM configuration. Also, the access zone and the legacy zone each use a TDM configuration.

Figure 6:
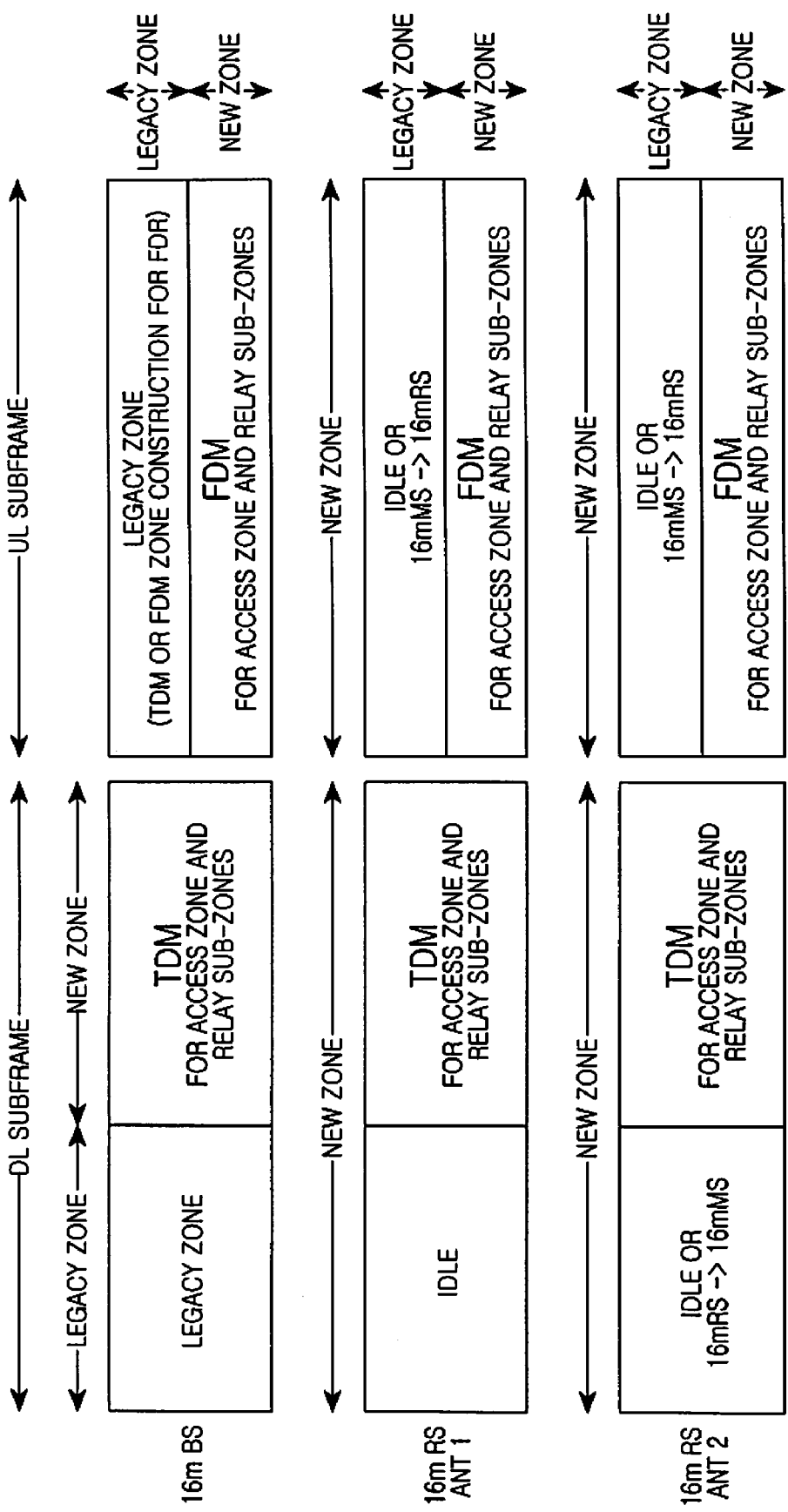
FIG. 6 is a diagram illustrating a type A of a full duplex relay IEEE 802.16m frame structure according to an embodiment of the present invention.

FIG. 6 is a diagram illustrating a type A structure of a full duplex relay IEEE 802.16m frame structure according to another embodiment of the present invention.

Referring to FIG. 6, a DL frame is divided into a legacy zone and a new zone. Herein, the new zone uses a TDM configuration. Also, it the legacy zones and the new zones use a TDM configuration each. A UL frame in FIG. 6 is divided into a legacy zone and a new zone. Herein, the new zones each use an FDM configuration, and the legacy zones and the new zones each use an FDM configuration.

The type B structure configures a new zone to include an access zone and a relay zone, wherein a DL section of the new zone is configured using TDM and a UL section of the new zone is configured using FDM. Herein, a legacy zone and a new zone may be configured in such a way that a UL section is set using TDM or FDM.

Figure 7:
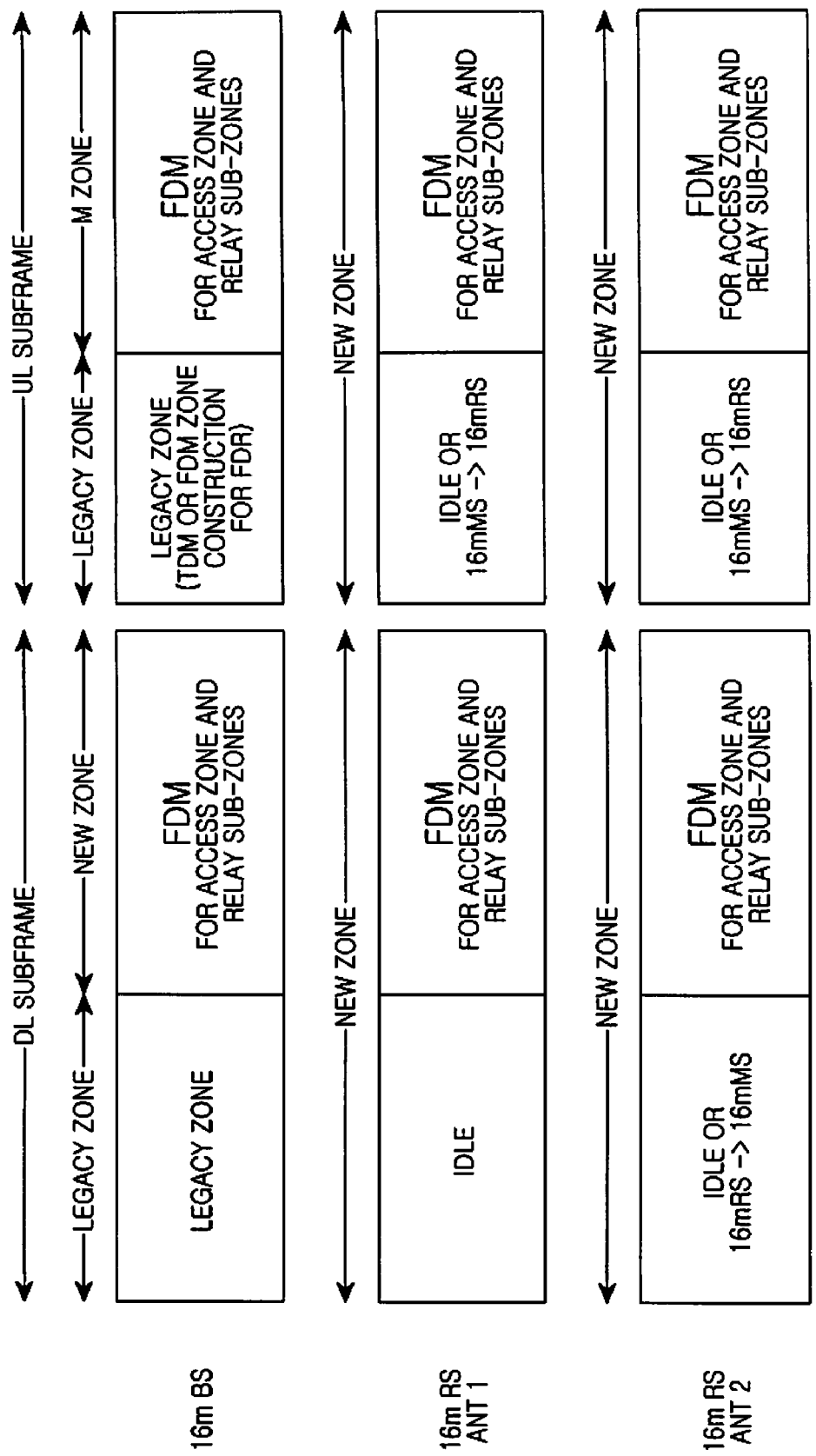
FIG. 7 is a diagram illustrating a type B of a full duplex relay IEEE 802.16m frame structure according to an embodiment of the present invention.

FIG. 7 is a diagram illustrating a type B structure of a full duplex relay IEEE 802.16m frame structure according to an embodiment of the present invention.

Referring to FIG. 7, a DL frame is divided into a legacy zone and a new zone. Herein, the new zones each use an FDM configuration, and the legacy zones and the new zones each use a TDM configuration.

A UL frame is also divided into a legacy zone and a new zone (or an M zone). Herein, the new zones (or the M zone) each use an FDM configuration. Also, the legacy zones and the new zones each use a TDM configuration.

Figure 8:
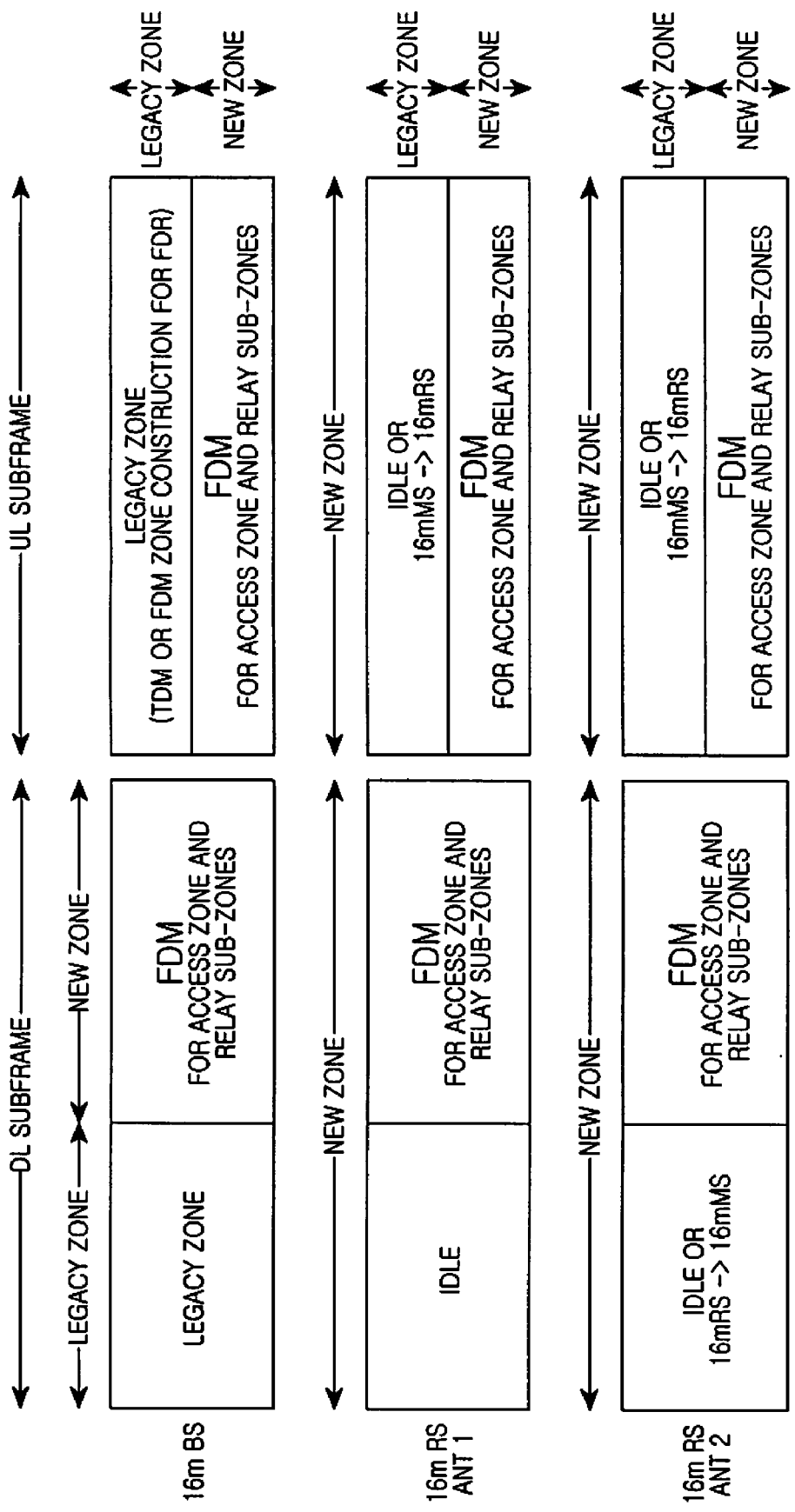
FIG. 8 is a diagram illustrating a type B of a full duplex relay IEEE 802.16m frame structure according to an embodiment of the present invention.

FIG. 8 is a diagram illustrating a type B structure of a full duplex relay IEEE 802.16m frame structure according to another embodiment of the present invention.

Referring to FIG. 8, a DL frame is divided into a legacy zone and a new zone. Herein, the new zones use an FDM configuration each. Also, the legacy zones and the new zones use a TDM configuration each.

A UL frame is also divided into a legacy zone and a new zone. Herein, the new zone uses an FDM configuration. Also, the legacy zones and the new zones use an FDM configuration each.

More detailed embodiments of the type A and B structures will be provided below, where the legacy zone and the new zone are configured using TDM in the UL section. This is applicable in the IEEE 802.16m zones illustrated in FIGS. 6 and 8, even when the UL section of the new zone and the legacy zone are configured in FDM.

Figure 9:
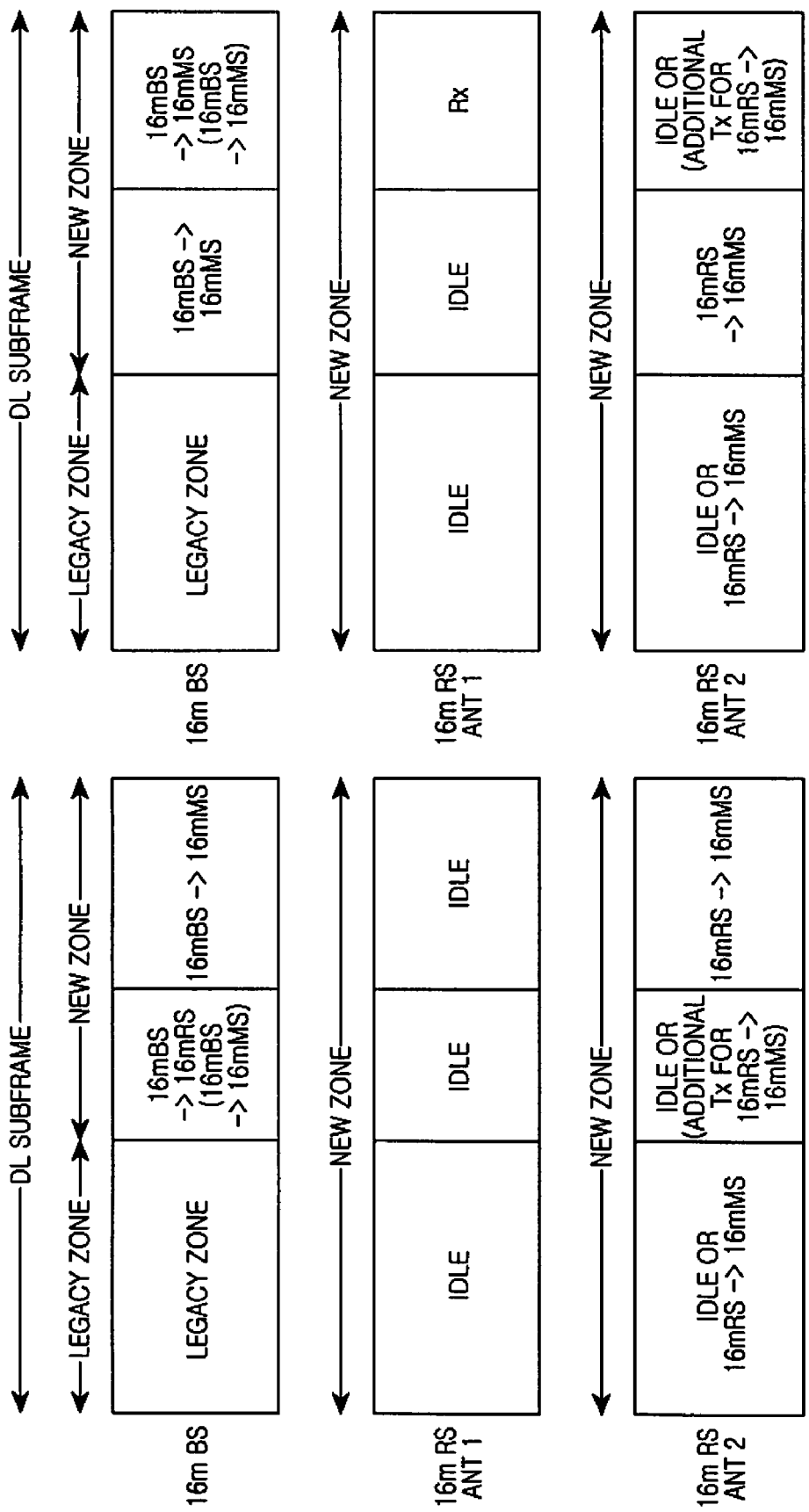
FIG. 9 is a diagram illustrating first and second DownLink (DL) frame structures for a full duplex relay IEEE 802.16m frame structure type A according to an embodiment of the present invention.
Figure 10:
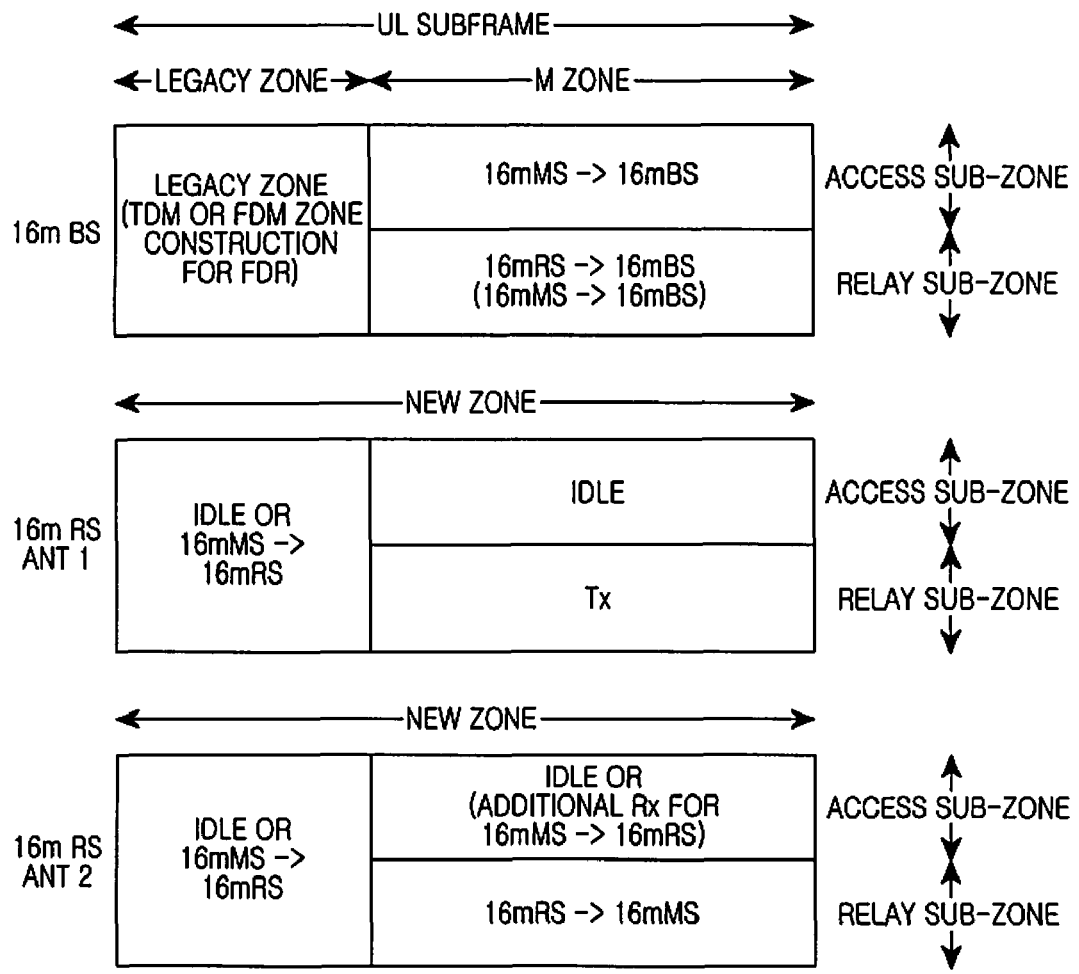
FIG. 10 is a diagram illustrating a first UpLink (UL) frame structure for a full duplex relay IEEE 802.16m frame structure type A according to an embodiment of the present invention.
Figure 11:
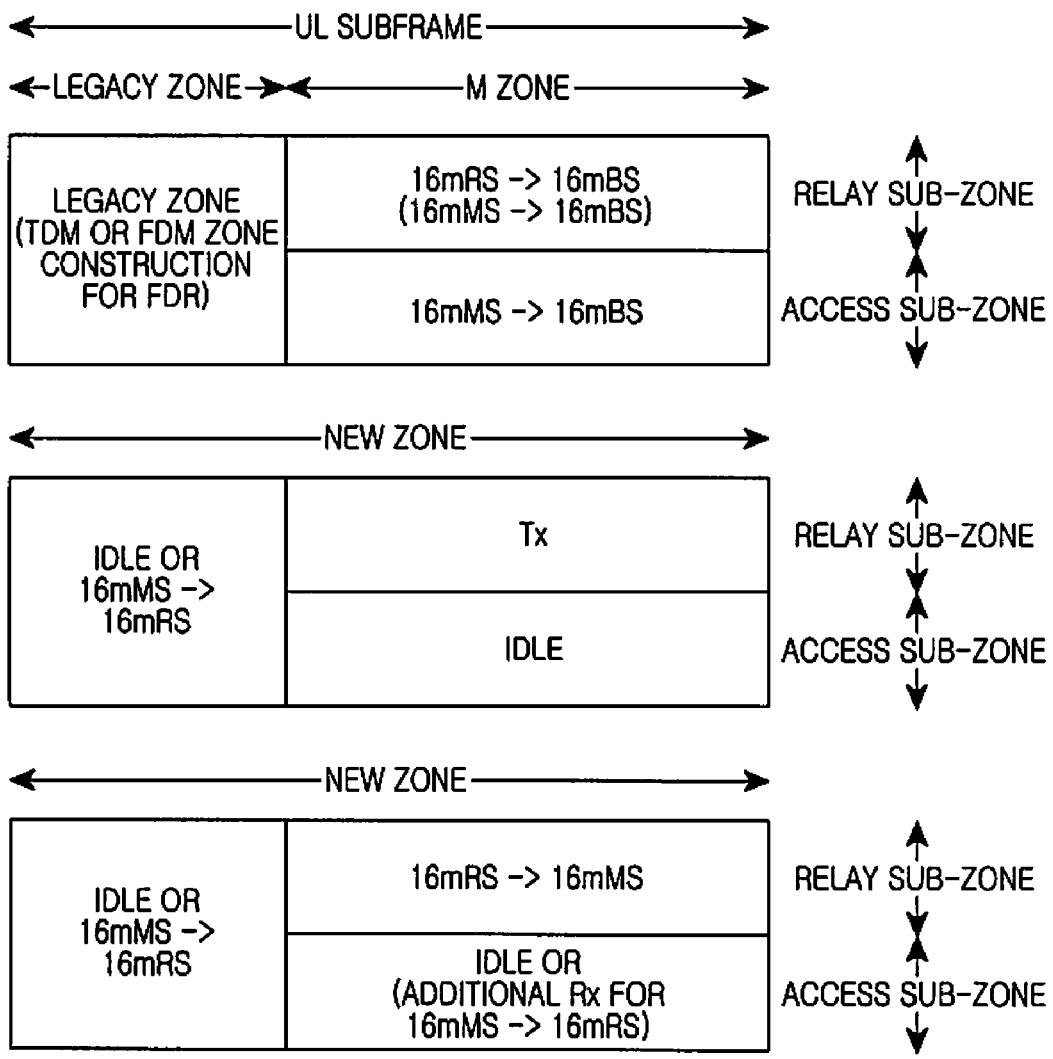
FIG. 11 is a diagram illustrating a second UL frame structure for a full duplex relay IEEE 802.16m frame structure type A according to an embodiment of the present invention.

The type A structure illustrates an example where a new zone is configured to include an access zone and a relay zone, and a configuration for the new zone is set to TDM in a DL section and set to TDM in a UL section. In the type A frame structure, the DL section may have two configurations as is illustrated in FIG. 9. Also, the UL section may have two configurations as illustrated in FIGS. 10 and 11. Thus, a total of 4 frame configurations are possible.

FIG. 9 is a diagram illustrating first and second DL frame structures for a full duplex relay IEEE 802.16m frame type A structure according to an embodiment of the present invention.

Referring to FIG. 9, a new zone is configured to include an access zone and a relay zone. The access zone denotes a zone between a base station and another entity. A configuration for the new zone is set to TDM in a DL section and set to TDM in a UL section (the UL section is not illustrated). The DL frame on the left of FIG. 9, illustrates an access zone being located at the right side in a new zone, and the DL frame on right side of FIG. 9 illustrates an access zone being located in the left side in a new zone. As set force above, the access zone denotes a zone between a base station and another entity.

FIG. 10 is a diagram illustrating a first UL frame structure for a full duplex relay IEEE 802.16m frame type A structure according to an embodiment of the present invention.

Referring to FIG. 10, a new zone is configured to include an access zone and a relay zone, and a configuration for the new zone is set to FDM in a UL section. More specifically, in FIG. 10, an access zone is located at the bottom in an M zone in a UL frame each and a relay zone is located at the top in the M zone in the UL frame each.

FIG. 11 is a diagram illustrating a second UL frame structure for a full duplex relay IEEE 802.16m frame type A structure according to an embodiment of the present invention.

Referring to FIG. 11, a new zone is configured to include an access zone and a relay zone, and a configuration for the new zone is set to FDM in a UL section. More specifically, in FIG. 11, an access zone is located at the top in an M zone in a UL frame each and a relay zone is located at the bottom in the M zone in the UL frame each.

The type B structure illustrates an example where a new zone is configured to include an access zone and a relay zone, and a configuration for the new zone is set to FDM in a DL section and set to FDM in a UL section.

Figure 12:
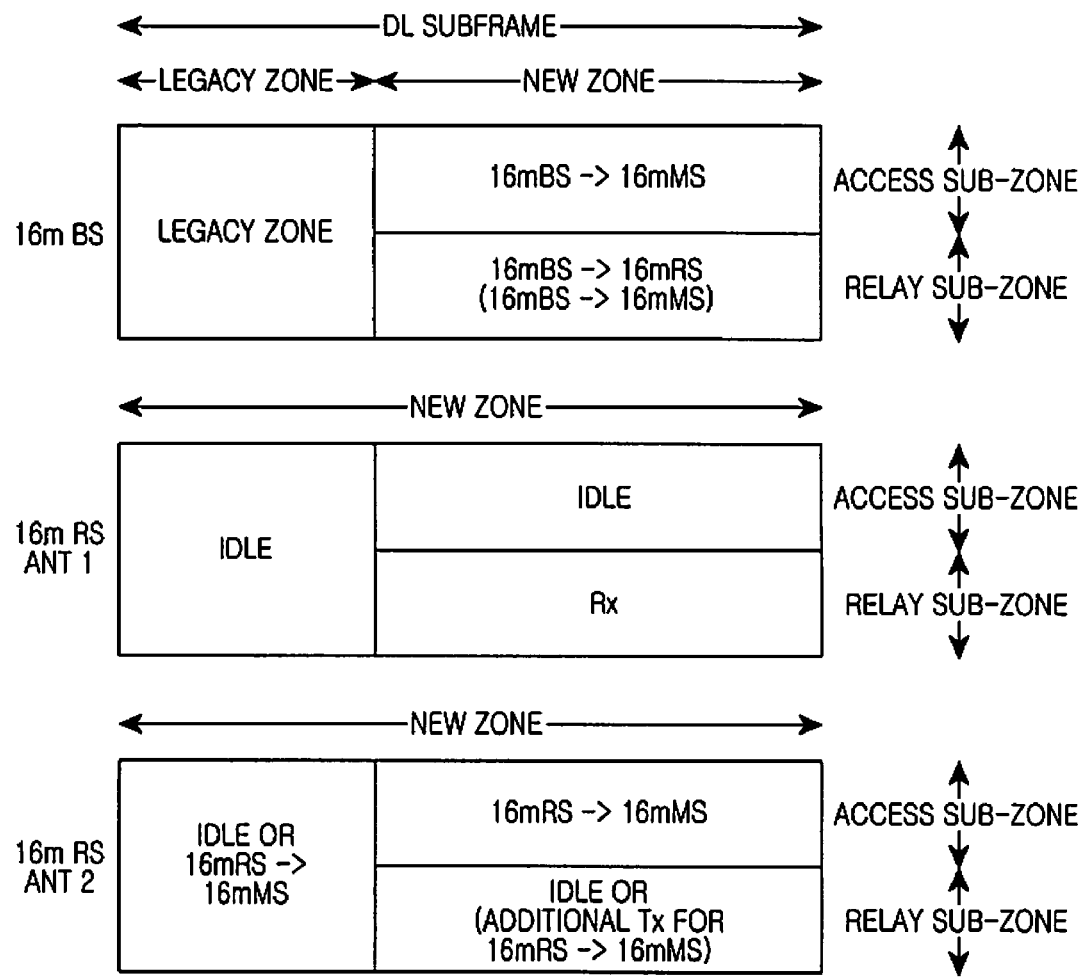
FIG. 12 is a diagram illustrating a first DL frame structure for a full duplex relay IEEE 802.16m frame structure type B according to an embodiment of the present invention.
Figure 13:
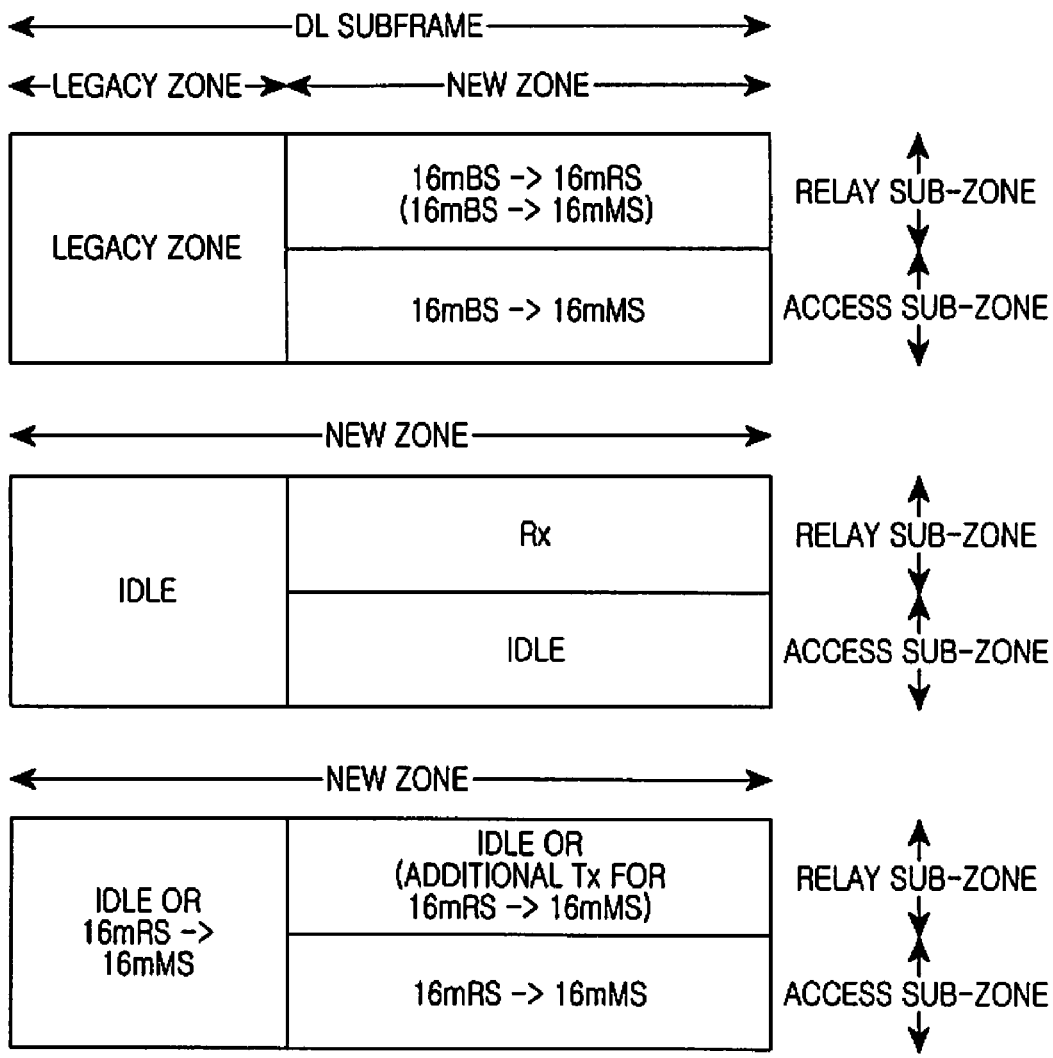
FIG. 13 is a diagram illustrating a second DL frame structure for a full duplex relay IEEE 802.16m frame structure type B according to an embodiment of the present invention.

In the type B frame structure, the UL section is identical to that of the type A structure and thus has two configurations as illustrated in FIGS. 10 and 11, and the DL section has two FDM configurations as illustrated in FIGS. 12 and 13. Accordingly, a total of 4 frame configurations are possible.

FIG. 12 is a diagram illustrating a first DL frame structure for a full duplex relay IEEE 802.16m frame type B structure according to an embodiment of the present invention.

Referring to FIG. 12, a new zone is configured to include an access zone and a relay zone, and a configuration for the new zone is set to FDM in a DL section. More specifically, in FIG. 12, an access zone is located at the top in a DL frame and a relay zone is located at the bottom.

FIG. 13 is a diagram illustrating a second DL frame structure for a full duplex relay IEEE 802.16m frame type B structure according to an embodiment of the present invention.

Referring to FIG. 13, a new zone is configured to include an access zone and a relay zone, and a configuration for the new zone is set to FDM in a DL section. More specifically, in FIG. 13, an access zone is located at the bottom in a DL frame and a relay zone is located at the top.

The UL frame may be configured in the IEEE 802.16m zone as illustrated in FIGS. 6 and 8 according to the aforesaid method, even when the UL of the new system and the legacy system is configured in FDM.

Figure 14:
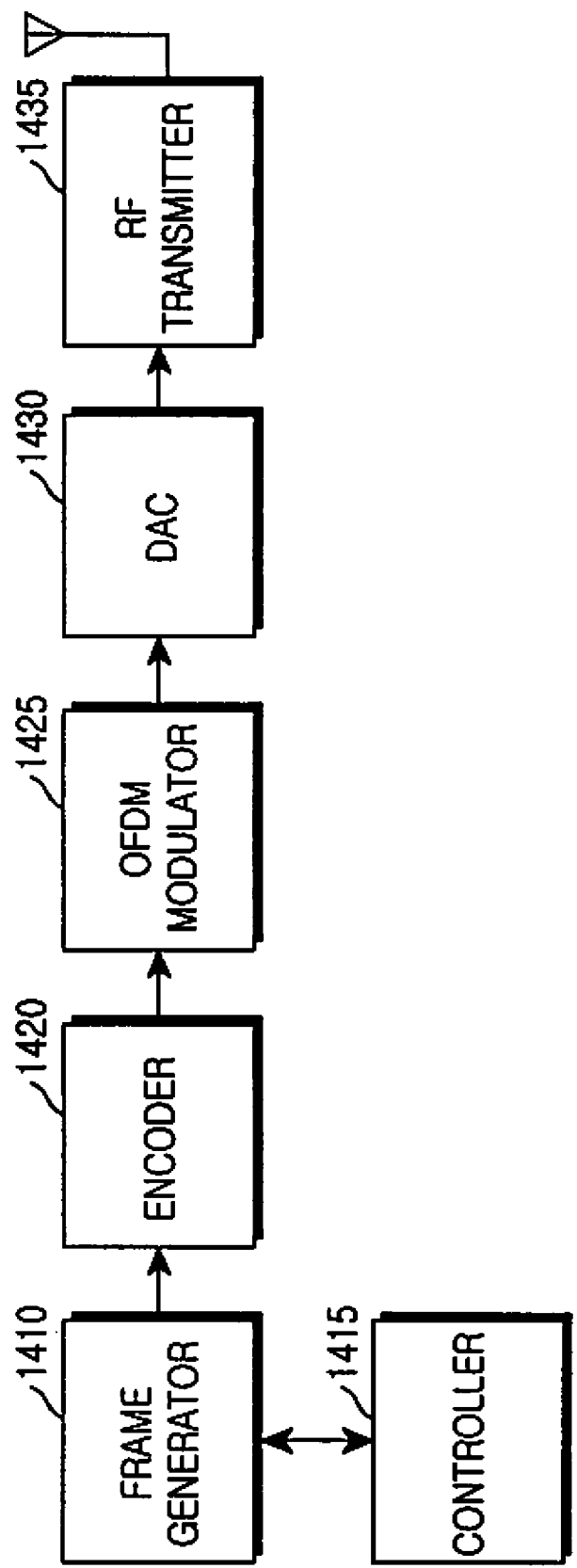
FIG. 14 is a block diagram of a transmitter for generating and transmitting a frame according to an embodiment of the present invention.

FIG. 14 is a block diagram of a transmitter for generating and transmitting a frame according to an embodiment of the present invention.

Referring to FIG. 14, a transmitter of a BS and an RS includes a controller 1415, a frame generator 1410, an encoder 1420, an Orthogonal Frequency Division Multiplexing (OFDM) modulator 1425, a Digital-to-Analog Converter (DAC) 1430, and an RF transmitter 1435. The controller 1415 controls the frame generator 1410 to generate the aforesaid DL or UL frame. Under the control of the controller 1415, the frame generator 1410 generates the aforesaid UL or DL frame and outputs the same to the encoder 1420. Herein, depending on the number of hops, an RX node may be an upper or lower relay, a BS or an MS.

The encoder 1420 encodes/modulates data from the frame generator 1410 in accordance with a predetermined Modulation level (e.g., a Modulation and Coding Scheme (MCS) level). The OFDM modulator 1425 Inverse Fast Fourier Transform (IFFT)-processes data from the encoder 1420 to output sample data (e.g., OFDM symbols), and the DAC 1430 converts the sample data into an analog signal.

The RF transmitter 1435 then converts the analog signal of the DAC 1430 into an RF signal and transmits the same through an antenna.

In the case of an RS, the encoder 1420 and the OFDM modulator 1425 correspond to the TX modem 130 as illustrated in FIG. 1.

In the aforesaid configuration, the controller 1415 is a protocol controller to control the frame generator 1410. That is, the controller 1415 may perform a function of the frame generator 1410.

Although separate units, i.e., 1410, 1420, 1425, 1430, and 1435, are provided for ease of illustration of the respective functions of the controller 1415, the controller 1415 may perform all or some of the functions on behalf of such separate units.

Figure 15:
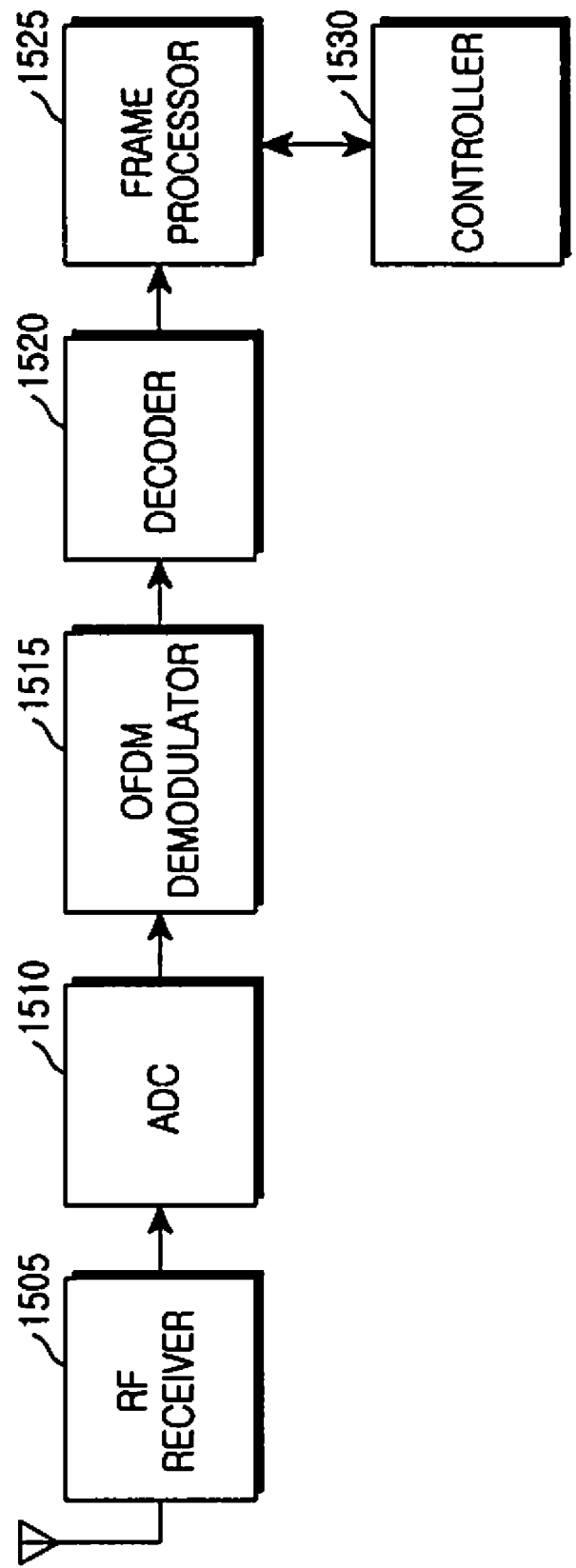
FIG. 15 is a block diagram of a receiver for receiving a frame according to an embodiment of the present invention.

FIG. 15 is a block diagram of a receiver for receiving a frame according to an embodiment of the present invention.

Referring to FIG. 15, a receiver of an RS and a BS includes an RF receiver 1505, an Analog-to-Digital Converter (ADC) 1510, an OFDM demodulator 1515, a decoder 1520, a frame processor 1525, and a controller 1530.

The RF receiver 1505 converts an RF signal from an antennal into a baseband analog signal. The ADC 1510 converts the analog signal from the RF receiver 605 into sample data. The OFDM demodulator 1515 Fast Fourier Transform (FFT)-processes the sample data from the ADC 1510 to output frequency-domain data. The decoder 1520 selects data of desired subcarriers (e.g., burst data) from the frequency-domain data of the OFDM demodulator 1515, and demodulates/decodes the selected data in accordance with a predetermined modulation level (e.g., an MCS level). The frame processor 1525 processes the aforesaid frame received from the decoder 1520. The controller 1530 controls the frame processors 1525 to process the contents of the frame.

In the case of an RS, the decoder 1520 and the OFDM demodulator 1515 correspond to the RX modem 120 as illustrated in FIG. 1.

In the aforesaid configuration, the controller 1530 is a protocol controller to control the frame processor 1525. That is, the controller 1530 may perform a function of the frame processor 1525.

As described above, in accordance with an embodiment of the present invention, a frame structure is provided for effectively supporting a full duplex relay system, thereby securing a Quality of Service (QoS) of an MS with poor RX performance and improving a total system capacity.

While the present invention has been shown and described with reference to certain embodiments thereof, it will be understood by those skilled in the art that various changes in form and details may be made therein without departing from the spirit and scope of the present invention as defined by the appended claims. Therefore, the scope of the present invention is defined not by the detailed description of the invention, but by the appended claims, and all differences within the scope will be construed as being included in the present invention.

What is claimed is:

1. An apparatus for generating a frame in a communication system supporting a full duplex relay, the apparatus comprising:
   a controller for configuring a legacy zone and a new zone in a DownLink (DL) section of the frame according to a Time Division Multiplexing (TDM) scheme, for configuring the new zone of the DL section to include an access zone and a relay zone according to the TDM scheme, for configuring a legacy zone and a new zone in an UpLink (UL) section of the frame according to the TDM scheme, and for configuring the new zone of the UL section to include an access zone and a relay zone according to a Frequency Division Multiplexing (FDM) scheme.

2. The apparatus of claim 1, wherein the communication system comprises an Institute of Electrical and Electronics Engineers (IEEE) 802.16m system.

3. An apparatus for generating a frame in a communication system supporting a full duplex relay, the apparatus comprising:
   a controller for configuring a legacy zone and a new zone in a DownLink (DL) section of the frame according to a Time Division Multiplexing (TDM) scheme, for configuring the new zone of the DL section to include an access zone and a relay zone according to the TDM scheme, for configuring a legacy zone and a new zone in an UpLink (UL) section of the frame according to a Frequency Division Multiplexing (FDM) scheme, and for configuring the new zone of the UL section to include an access zone and a relay zone according to the FDM scheme.

4. The apparatus of claim 3, wherein the communication system comprises an Institute of Electrical and Electronics Engineers (IEEE) 802.16m system.

5. An apparatus for generating a frame in a communication system supporting a full duplex relay, the apparatus comprising:
   a controller for configuring a legacy zone and a new zone in a DownLink (DL) section of the frame according to a Time Division Multiplexing (TDM) scheme, for configuring the new zone of the DL section to include an access zone and a relay zone according to a Frequency Division Multiplexing (FDM) scheme, for configuring a legacy zone and a new zone in an UpLink (UL) section of the frame according to the TDM scheme, and for configuring the new zone of the uplink section to include an access zone and a relay zone according to the FDM scheme.

6. The apparatus of claim 5, wherein the communication system comprises an Institute of Electrical and Electronics Engineers (IEEE) 802.16m system.

7. An apparatus for generating a frame in a communication system supporting a full duplex relay, the apparatus comprising:
- a controller for configuring a legacy zone and a new zone in a DownLink (DL) section of the frame according to a Time Division Multiplexing (TDM) scheme, for configuring the new zone of the downlink section to include an access zone and a relay zone according to a Frequency Division Multiplexing (FDM) scheme, for configuring a legacy zone and a new zone in an UpLink (UL) section of the frame according to the FDM scheme, and for configuring the new zone of the uplink section to include an access zone and a relay zone according to the FDM scheme.

8. The apparatus of claim 7, wherein the communication system comprises an Institute of Electrical and Electronics Engineers (IEEE) 802.16m system.

9. A method for generating a frame by a controller in a communication system supporting a full duplex relay, the method comprising:
- configuring, by the controller, a legacy zone and a new zone in a DownLink (DL) section of the frame according to a Time Division Multiplexing (TDM) scheme;
- configuring, by the controller, the new zone of the DL section to include an access zone and a relay zone according to the TDM scheme;
- configuring, by the controller, a legacy zone and a new zone in an UpLink (UL) section of the frame according to the TDM scheme; and
- configuring the new zone of the UL section to include an access zone and a relay zone according to a Frequency Division Multiplexing (FDM) scheme.

10. The method of claim 9, wherein the communication system includes an Institute of Electrical and Electronics Engineers (IEEE) 802.16m system.

11. A method for generating a frame by a controller in a communication system supporting a full duplex relay, the method comprising:
- configuring, by the controller, a legacy zone and a new zone in a DownLink (DL) section of the frame according to a Time Division Multiplexing (TDM) scheme;
- configuring, by the controller, the new zone of the DL section to include an access zone and a relay zone according to the TDM scheme;
- configuring, by the controller, a legacy zone and a new zone in an UpLink (UL) section of the frame according to a Frequency Division Multiplexing (FDM) scheme; and
- configuring, by the controller, the new zone of the UL section to include an access zone and a relay zone according to the FDM scheme.

12. The method of claim 11, wherein the communication system includes an Institute of Electrical and Electronics Engineers (IEEE) 802.16m system.

13. A method for generating a frame by a controller in a communication system supporting a full duplex relay, the method comprising:
- configuring, by the controller, a legacy zone and a new zone in a DownLink (DL) section of the frame according to a Time Division Multiplexing (TDM) scheme;
- configuring, by the controller, the new zone of the DL section to include an access zone and a relay zone according to a Frequency Division Multiplexing (FDM) scheme;
- configuring, by the controller, a legacy zone and a new zone in an UpLink (UL) section of the frame according to the TDM scheme; and
- configuring, by the controller, the new zone of the UL section to include an access zone and a relay zone according to the FDM scheme.

14. The method of claim 13, wherein the communication system includes an Institute of Electrical and Electronics Engineers (IEEE) 802.16m system.

15. A method for generating a frame by a controller in a communication system supporting a full duplex relay, the method comprising:
- configuring, by the controller, a legacy zone and a new zone in a DownLink (DL) section of the frame according to a Time Division Multiplexing (TDM) scheme;
- configuring, by the controller, the new zone of the DL section to include an access zone and a relay zone according to a Frequency Division Multiplexing (FDM) scheme;
- configuring, by the controller, a legacy zone and a new zone in an UpLink (UL) section of the frame according to the FDM scheme; and
- configuring, by the controller, the new zone of the UL section to include an access zone and a relay zone according to the FDM scheme.

16. The method of claim 15, wherein the communication system includes an Institute of Electrical and Electronics Engineers (IEEE) 802.16m system.

* * * * *